United States Patent
Bazaz (10) Patent No.: US 9,631,642 B2
(45) Date of Patent: Apr. 25, 2017

(54) METHOD FOR STORING ENERGY (71) Applicant: Spar Energy LLC, Edgewater, NJ (US)

(72) Inventor: Gaurav Bazaz, Edgewater, NJ (US)

(73) Assignee: Spar Energy LLC, Edgewater, NJ (US)

( * ) Notice: Subject to any disclaimer, the term of this patent is extended or adjusted under 35 U.S.C. 154(b) by 59 days.

(21) Appl. No.: 14/845,241

(22) Filed: Sep. 3, 2015

(65) Prior Publication Data

US 2016/0069356 A1 Mar. 10, 2016

Related U.S. Application Data (60) Provisional application No. 62/046,063, filed on Sep. 4, 2014.

(51) Int. Cl.
| | | |
|---|---|---|
| *F16D 31/02* | (2006.01) | |
| *F15B 11/06* | (2006.01) | |
| *F15B 1/02* | (2006.01) | |

(52) U.S. Cl.
CPC ............. *F15B 11/06* (2013.01); *F15B 1/024* (2013.01); *Y02E 60/15* (2013.01)

(58) Field of Classification Search
CPC ........... F15B 1/024; F15B 21/14; Y02E 60/15
See application file for complete search history.

(56) References Cited

U.S. PATENT DOCUMENTS

| | | | | |
|---|---|---|---|---|
| 3,878,409 A | * | 4/1975 | Gill ..................... | H02K 44/08 |
| | | | | 310/11 |
| 4,178,759 A | * | 12/1979 | Cook ..................... | F03G 7/00 |
| | | | | 310/10 |
| 2011/0142185 A1 | | 6/2011 | Woodruff | |
| 2015/0020519 A1 | | 1/2015 | Klostermann | |
| 2015/0108765 A1 | | 4/2015 | Choi | |
| 2016/0369821 A1 | | 12/2016 | Bazaz | |

OTHER PUBLICATIONS

"International Application Serial No. PCT/US2016/050262, International Search Report mailed Nov. 18, 2016", 2 pgs.
"International Application Serial No. PCT/US2016/050262, Written Opinion mailed Nov. 18, 2016", 4 pgs.

\* cited by examiner

*Primary Examiner* — Michael Leslie
(74) *Attorney, Agent, or Firm* — Schwegman Lundberg & Woessner, P.A.

(57) ABSTRACT

Disclosed is a method for storing energy using an electrically charged gas. The method includes the steps of compressing the electrically charged gas in a compression chamber using external force to generate compressed charged gas; storing the compressed charged gas received from the compression chamber in a containment chamber; transferring a portion of compressed charged gas into the energy recovery unit at high pressure; and expanding the compressed electrically charged gas to regenerate energy in the energy recovery unit.

7 Claims, 8 Drawing Sheets

METHOD FOR STORING ENERGY

CROSS-REFERENCE TO RELATED ART

This application claims priority to Provisional Patent Application No. 62/046,063, filed on Sep. 4, 2014, by Gaurav Bazaz, and is entitled in whole or in part to that filing date for priority.

BACKGROUND OF THE INVENTION

1. Field of the Invention

The present invention generally relates to a method for storing energy, and more particularly relates to a method for storing energy using compressed electrically charged gas.

2. Description of Related Art

Current models for energy storage suffer from poor energy densities and high cost of operation. Most common energy storage devices such as batteries use various types of designs but all eventually rely on separation of charges thereby creating an electric field or electromotive force between the positively and negatively charged regions wherein the energy is stored.

Some other methods store energy in chemical bonds of substances while some others use mechanical set ups to store energy. Examples of Chemical Energy storage include Hydrogen Fuel as well as Fossil Fuels such as Gasoline. Mechanical energy storage is seen in Flywheels, Compressed Air Storage as well as Pumped Hydro.

All current models suffer from one of two, or both, problems—High energy density options, such as fossil fuels, are environmentally destructive and can't feasibly be manufactured synthetically in an economical way. On the other hand, systems that can be produced synthetically and manufactured economically generally have very low energy densities (Joules/kg or Joules/m$^3$) making them unviable for various commercial requirements. Besides, the cost in terms of Dollars per Kilo-watt-hour ($/kwhr) is usually too high to be practical.

Therefore, there is a need of a new method for storing energy with large energy densities, comparable to and possibly much higher than fossil fuels, while also being environmentally friendly, easy to manufacture, efficient, versatile, scalable and highly economical.

SUMMARY OF THE INVENTION

In accordance with the teachings of the present invention, a method for storing energy in a compressed charged gas is provided.

An object of the present invention is to provide a method for storing energy with an electrically charged gas. The method initiates with the step of compressing the electrically charged gas in a compression chamber using external force. The step is then followed by the step of storing the compressed charged gas received from the compression chamber in a containment chamber.

The method further includes the steps of transferring a portion of the compressed charged gas into the energy recovery unit at high pressure and expanding the compressed electrically charged gas inside the energy recovery unit to regenerate energy.

Another object of the present invention is to provide the method that includes the steps of creating homogenously electrically charged gas; and transmitting the homogenously electrically charged gas into the compression chamber. Another object of the present invention is to provide a method that allows compression of the homogenously electrically charged gas in the containment chamber itself.

Another object of the present invention is to provide alternatives to the electrical battery and providing a more convenient and eco-friendly solution to store energy. Another object of the present invention is to use xenon gas for storing energy.

DETAILED DESCRIPTION OF DRAWINGS

While this technology is illustrated and described in a preferred embodiment, a method for storing energy using a charged gas, may be produced in different conditions, materials and by using various equipment. This is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Reference will now be made in detail to several embodiments of the invention which are illustrated in the accompanying drawings. Wherever feasible and convenient, the same reference numerals are used in the figures and the description to refer to the same or like parts. The drawings are in a simplified form and not to precise scale. For purposes of convenience and clarity only, directional terms, such as top, bottom, left, right, up, down, over, above, below, beneath, rear, and front may be used with respect to the accompanying drawings. In addition, words such as attached, affixed, coupled, connected and similar terms with their inflectional morphemes are used interchangeably, unless the difference is noted or made otherwise clear from the context. These words and expressions do not necessarily signify direct connections, but include connections through mediate components and devices.

Figure 1:
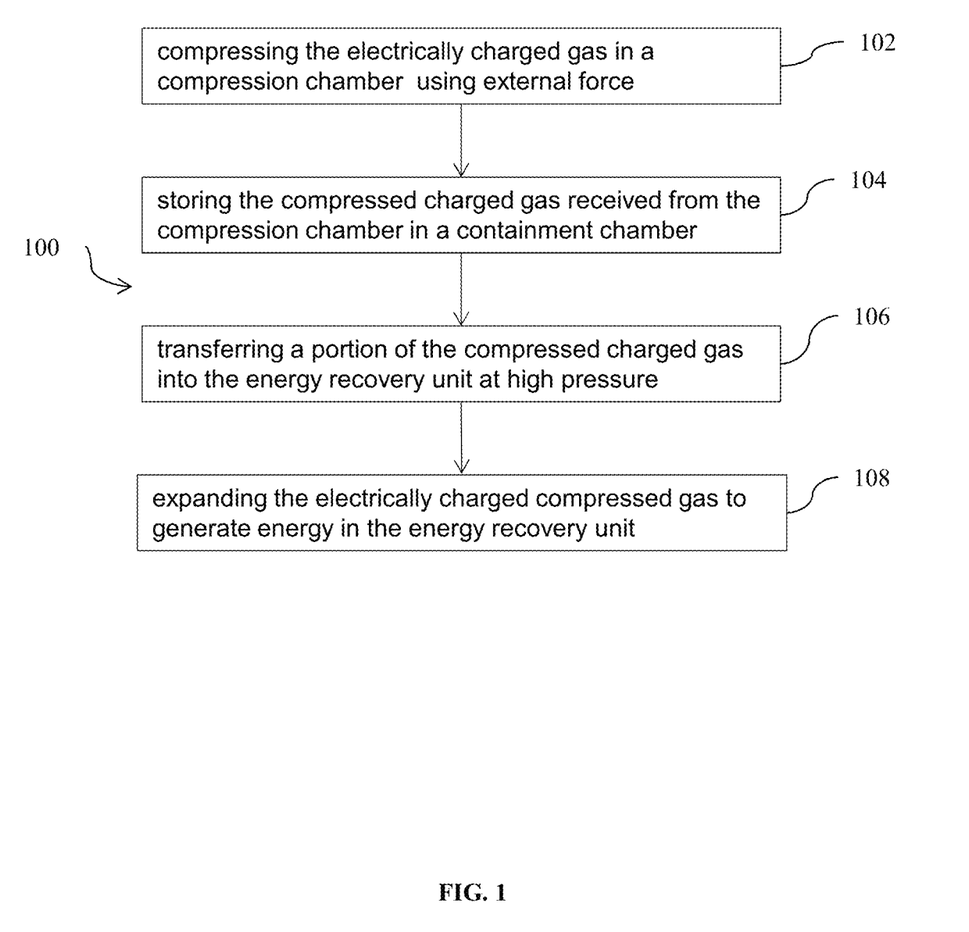
FIG. 1 illustrates a flowchart of a method for storing energy in accordance with a preferred embodiment of the present invention.

FIG. 1 illustrates a flowchart of a method 100 for storing energy in accordance with a preferred embodiment of the present invention. The method 100 initiates with a step 102 of compressing the electrically charged gas in a compression chamber using external force.

In a preferred embodiment of the present invention, the gas is composed of homogenously electrically charged particles. This means, substantially all gas particles have an electric charge and the electric charge is of the same polarity. Preferably, the gas is Xenon. However, it would be readily apparent to those skilled in the art that various gases may be envisioned without deviating from the scope of the present invention. The step 102 of compression of electrically charged gas is explained in detail in conjunction with FIG. 3 of the present invention.

In a preferred embodiment, the compression results in storage of energy in the gas. The compression is achieved by drawing energy from an external source, such as the electric grid, and using it to compress the electrically charged gas. As the gas is compressed, energy is stored in the increased pressure inside the gas. So the energy drawn by the compression system from the external source, is now stored as pressure energy inside the compressed charged gas. As would be apparent to one skilled in the art, electrically charged particles with the same charge polarity repel each other, therefore when they are forced close to each other, i.e. compressed, a significant amount of pressure energy is stored in their mutual repulsion. Relative to conventional neutral gas compression methods, the same number of particles will store dramatically larger amounts of energy when they are electrically charged with the same polarity, compared to when they are electrically neutral. Compressed electrically charged gas will store energy in the mechanical pressure and the electromagnetic pressure of the gas while conventional neutral gas compression stores energy only in the mechanical pressure of the gas.

The step 102 is then followed by a step 104 of injecting the compressed charged gas received from the compression chamber in a containment chamber. The compression results in storage of energy in the gas and thus the energy is stored in the containment chamber once the compressed charged gas is transferred into it. Unlike, conventional compressed air energy storage systems, which utilize electrically neutral gases as working fluids, the present invention utilizes an electrically charged gas as the working fluid.

The transfer of compressed charged gas to the containment chamber, results in transfer of stored energy into the containment chamber, in the form of mechanical and electromagnetic pressure energy in the compressed charged gas. The process of storing the compressed charged gas in the containment chamber is explained in detail in conjunction with FIG. 3 of the present invention.

The step 104 is then followed by a step 106 of transferring a portion of the compressed charged gas into the energy recovery unit at high pressure. In a preferred embodiment of the present invention, the high pressure compressed gas is transferred by controlling the flow of the compressed charged gas using valves. The process of transfer of compressed charged gas into the energy recovery unit is explained in detail in conjunction with FIG. 4 of the present invention.

The step 106 is then followed by the step 108 of expanding the compressed electrically charged gas to regenerate energy in the energy recovery unit. The expansion causes the compressed gas to release the pressure energy stored within for performing useful work. Both the mechanical pressure and electromagnetic pressure s of the gas are released during the expansion process. The expansion of the compressed gas is explained in detail in conjunction with FIG. 5 of the present invention.

In another preferred embodiment of the present invention, the method 100 further includes a step of creating homogenously electrically charged gas and is further followed by the step of transmitting the homogenously electrically charged gas into the compression chamber. The step of creating and transmitting homogenously electrically charged gas into the compression chamber is explained in detail in conjunction with FIG. 7 of the present invention.

In another preferred embodiment of the present invention, the method 100 further includes a step of exhausting the charged gas for safe disposal from the energy recovery unit. The decompressed charged gas is released from the exhaust channel connected to the energy recovery unit. The step of exhausting the charged gas is explained in detail in conjunction with FIG. 6 of the present invention.

Figure 2:
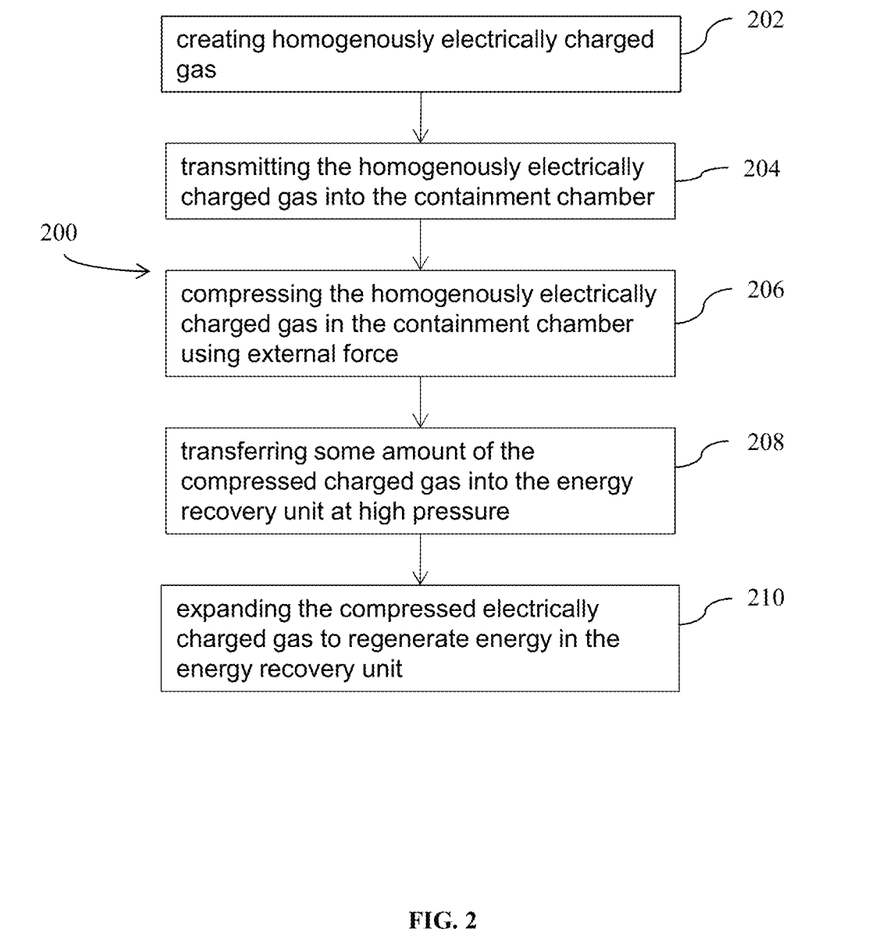
FIG. 2 illustrates another flowchart for a method for storing energy in accordance with another preferred embodiment of the present invention.

FIG. 2 illustrates another flowchart of a method 200 for storing energy using an electrically charged gas. The method 200 initiates with a step 202 of creating homogenously electrically charged gas. The step 202 is then followed by the step 204 of transmitting the homogenously electrically charged gas into the containment chamber. The step 202 and the step 204 are explained in detail in conjunction with FIG. 7 of the present invention.

The step 204 is then followed by a step 206 of compressing the homogenously electrically charged gas in the containment chamber using external force.

Figure 8:
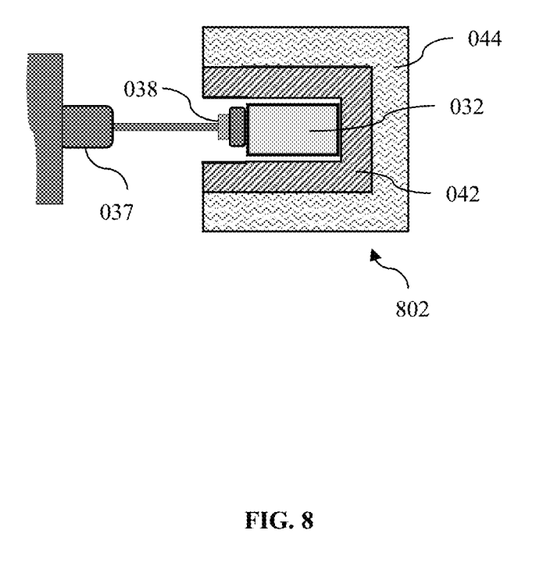
FIG. 8 illustrates another schematic view showing the compressing of homogenously electrically charged gas in the containment chamber using external force.

The compression of the homogenously electrically charged gas in the containment chamber is explained in detail in conjunction with FIG. 8 of the present invention.

The step 206 is then followed by a step 208 of transferring a portion of compressed charged gas into the energy recovery unit at high pressure. The step 208 is explained in detail in conjunction with FIG. 4 of the present invention. The step 208 is then followed by a step 210 of expanding the compressed electrically charged gas to regenerate energy in the energy recovery unit. The step 210 is explained in detail in conjunction with FIG. 5 of the present invention.

In another preferred embodiment of the present invention, the method 200 further includes a step of exhausting the charged gas for safe disposal from the energy recovery unit. The step of exhausting the gases is explained in detail in conjunction with FIG. 6 of the present invention.

Figure 3:
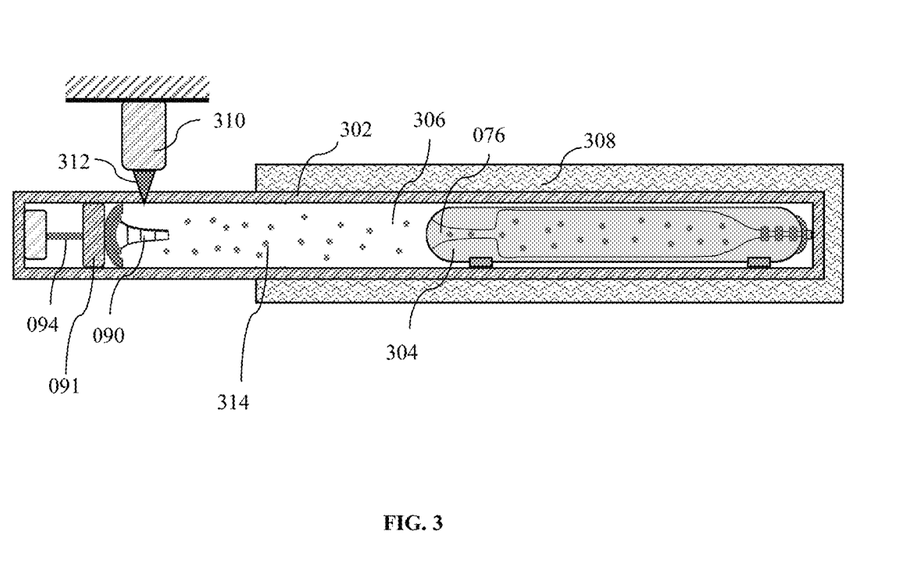
FIG. 3 illustrates a schematic view showing the compression chamber and the containment chamber in accordance with a preferred embodiment of the present invention.

FIG. 3 illustrates a schematic view showing the compression chamber 302 and the containment chamber 304 in accordance with a preferred embodiment of the present invention. The containment chamber 304 is securely placed inside the compression chamber 302. The total volume of the containment chamber 304 is less than the total volume of the compression chamber 302. Thus, a free space 306 is created in the compression chamber 302.

Initially, the containment chamber 304 is locked inside the compression chamber 302. The containment chamber 304 has an open injection channel 076. The compression chamber 302 is further surrounded by the compression heat capture sink 308. The air inside the compression chamber 302 and the containment chamber 304 is evacuated to achieve near complete vacuum i.e. very low air pressure.

The compression chamber 302 is further attached with a compression piston 094. The compression piston 094 includes a piston head 091 and an injection channel seal 090 attached to the piston head 091. Further, a charged gas injector 310 including a nozzle 312 securely injects the charged gas 314 into the compression chamber 302. The injected gas also enters the containment chamber 304 through the open injection channel 076.

Thus, the free space 306 of the compression chamber 302 and the containment chamber 304 are filled with the charged gas 314. The charged gas injector 310 keeps injecting the charged gas till a predetermined pressure is achieved inside the free space 306 and containment chamber 304. On achieving the predetermined pressure, the nozzle 312 is sealed. The nozzle is embedded within the walls of the containment chamber 302 so it doesn't interfere with the movements of the piston head 091.

Thereafter, the compression piston 094 pushes the piston head 091 with the attached open channel seal 090 inwards towards the containment chamber 304. As the piston 094 moves, the piston head 091 compresses the charged gas in the free space 306 and the containment chamber 304. The piston head 091 is designed such that no gas from one side of it, in the compression chamber 302, can escape to the other side.

As the piston head 091 moves across the containment chamber 302, towards the containment chamber 304, it reduces the volume available to the charged gas 314, causing it to compress. As the piston head 091 moves towards the containment chamber 304, larger amounts of the charged gas move from the free space 306 into the containment chamber 304 through the open injection channel 076.

Eventually, substantially all the charged gas from the free space 306 is forced into the containment chamber 304, through the open injection channel 076. Since the volume of free space that the charged gas 314 occupies inside the containment chamber 304 is smaller than the volume of total free space among both the containment chamber 304 and compression chamber 302, the charged gas is now in a compressed state.

At this point, the injection channel seal 090 is firmly inside the containment chamber injection channel 076, and locks the open injection channel 076. The injection channel seal 090 is now sealed into the containment chamber 304 thus establishing a high pressure inside the containment chamber 304.

In this process, the compression piston 094 draws energy from an external energy source, and by compressing the charged gas 314, it does work on the charged gas 314 and stores energy in the pressure energy of the charged gas. The charged gas 314 has both mechanical and electromagnetic pressure energy, which increases in proportion to ratio of compression.

Examples of external energy source include but are not limited to the electric grid and fossil fuels. It would be readily apparent to those skilled in the art that various compression processes may be envisioned such as electric and magnetic compression methods without deviating from the scope of the present invention.

This method allows dramatically greater amounts of energy to be stored for the same level of compression. The energy is stored in both the mechanical pressure and electromagnetic pressure between charged gas particles. While in conventional compressed gas systems, the energy is stored only in the mechanical pressure of the gas.

Thus, the compression leads to the increase in pressure of the charged gas 314 inside the containment chamber 304. The charged gas 314 is now occupying a much smaller volume and thus considerable amount of pressure energy is stored in the containment chamber 304. The injection channel seal 090 is then permanently screwed on so that no compressed charged gas escapes from the containment chamber 304 through the open injection channel 076. The containment chamber 304 is now a carrier of stored energy, similar to an electric battery. When operatively connected to an energy recovery unit, the energy stored within the containment chamber can be extracted to do useful work.

Figure 4:
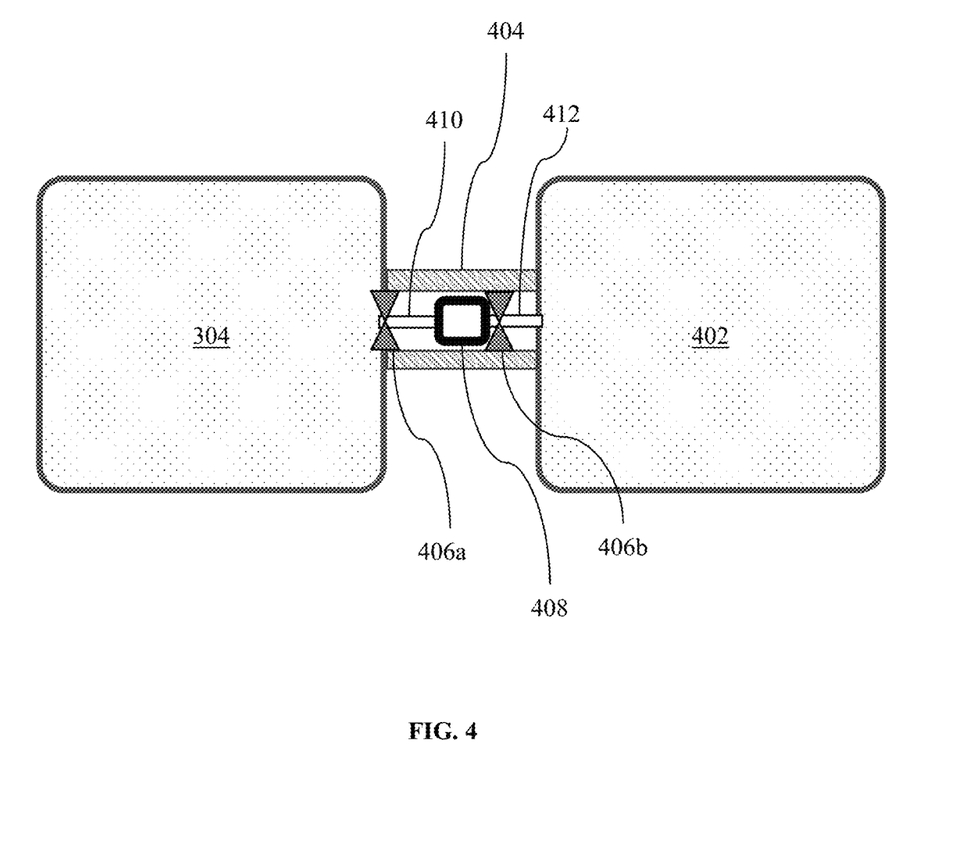
FIG. 4 illustrates a schematic view showing the transfer of the compressed charged gas from containment chamber to energy recovery unit in accordance with a preferred embodiment of the present invention.

FIG. 4 illustrates a schematic view showing the transfer of some amount of the compressed charged gas from the containment chamber 304 to an energy recovery unit 402 in accordance with a preferred embodiment of the present invention. The compressed charged gas enters into the energy recovery unit at a very high pressure. In this energy recovery unit 402, the pressure of compressed charged gas is reduced to its normal pressure i.e. at standard temperature and at atmospheric pressure, by allowing expansion of the compressed charged gas.

The containment chamber 304 is connected to the energy recovery unit 402 through a transfer channel 404. Further, plurality of valves such as an outflow valve 406a is operatively connected to the transfer channel 404 to control the outflow of the compressed charged gas from the containment chamber 304; and an inflow valve 406b connected to transfer channel 404 to control the inflow of the compressed charged gas into the energy recovery unit 402.

The transfer channel 404 is further composed of an outflow tube 410 and an inflow tube 412. The outflow valve 406a controls the flow of fluid through the outflow tube 410. When the valve 406a is opened, fluid flows between the outflow tube 410 and the containment chamber 304.

When valve 406a is closed, no fluid flows between outflow tube 410 and containment chamber 304. The valve 406b performs the same function with respect to the inflow tube 412. When valve 406b is opened, fluid flows between the inflow tube 412 and the energy recovery unit 402, when the valve is closed, no fluid flows between the two.

In a preferred embodiment, the outflow valve 406a opens for a very short duration of time to allow some of the very high pressure compressed charged gas to escape from the containment chamber 304 and enter a loading chamber 408 through the outflow tube 410. The loading chamber 408 is now loaded with compressed charged gas at a very high pressure. The outflow valve 406a is then sealed shut to prevent any further outflow or inflow from the containment chamber 304.

Thereafter, the inflow valve 406b is opened to allow transfer of the compressed charged gas into the energy recovery unit 402 at a very high pressure from the loading chamber 408. The inflow valve 406b closes when a predetermined amount of compressed charged gas is transferred into the energy recovery unit 402.

It would be readily apparent to those skilled in the art that various other systems may also be envisioned for transferring the compressed charged gas from the containment chamber 304 into the energy recovery unit 402 without deviating from the scope of the present invention.

Figure 5:
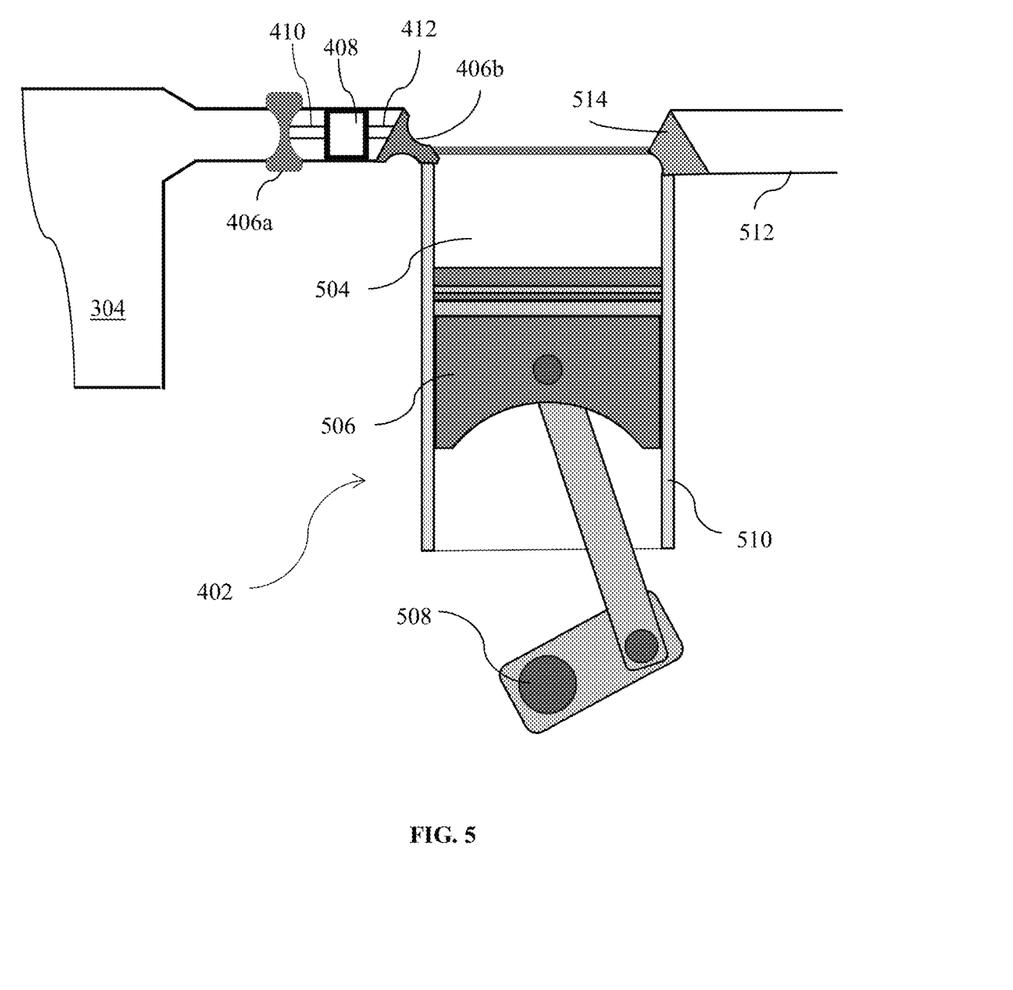
FIG. 5 illustrates a schematic view showing the energy recovery unit in accordance with a preferred embodiment of the present invention.

FIG. 5 illustrates a schematic view showing the energy recovery unit 402 in accordance with a preferred embodiment of the present invention. The energy recovery unit 402 includes an expansion chamber 504, piston 506, drive shaft 508 and a cylinder 510. The inflow valve 406b injects the compressed charged gas received from the containment chamber 304 via the outflow valve 406a, the outflow tube 410, the loading chamber 408 and through the inflow tube 412 into the energy recovery unit 402. Once the compressed charged gas is injected into the cylinder 510, the inflow valve 406b is sealed shut.

The compressed charged gas expands exponentially in the expansion chamber 504 of the cylinder 510 due to its internal pressure. The piston is movable and thus allows the compressed charged gas to expand. The compressed charged gas drives the piston downwards and releases its pressure energy which is used to do work. The amount of the compressed charged gas in the loading chamber 408 is directly proportional to the maximum size of the expansion chamber 504. The maximum size of the expansion chamber 504 is limited by the extent to which the piston 506 can move.

The ratio of volume of the loading chamber 408 and the maximum volume of the expansion chamber 504, which is when the piston is at its farthest position, is essentially equal to the compression ratio of the charged gas. The compression ratio of the charged gas is defined as the ratio of the volume occupied by the charged gas at standard temperature and atmospheric pressure, versus the volume occupied in the containment chamber 304 by the same mass of charged gas.

The pressure in the charged gas in the loading chamber 408 is essentially equal to the pressure in the containment chamber. And the pressure in the charged gas when the expansion chamber is fully expanded with the piston at its farthest position, is essentially same as the pressure of the charged gas prior to any compression in step 102 of FIG. 1.

Further, when the piston 506 has been moved to its farthest point then the compressed charged gas is fully expanded. The piston 506 drives the drive shaft 508. The drive shaft 508 in turn provides the mechanical work such as driving a generator to produce electricity. Thus, the expansion of the compressed charged gas is converted into mechanical work and thereafter electric energy.

Once the piston 506 reaches its farthest position in the cylinder 510, the exhaust valve 514 opens. Thereafter, the piston 506 moves upwards to move the expanded charged gas out of the expansion chamber 504 into the exhaust channel 512 through the exhaust valve 514. When the piston 506 moves to the peak position within the cylinder 510, the expanded charged gas is fully ejected from the cylinder 510 through the exhaust valve 514 into the exhaust channel 512.

Figure 7:
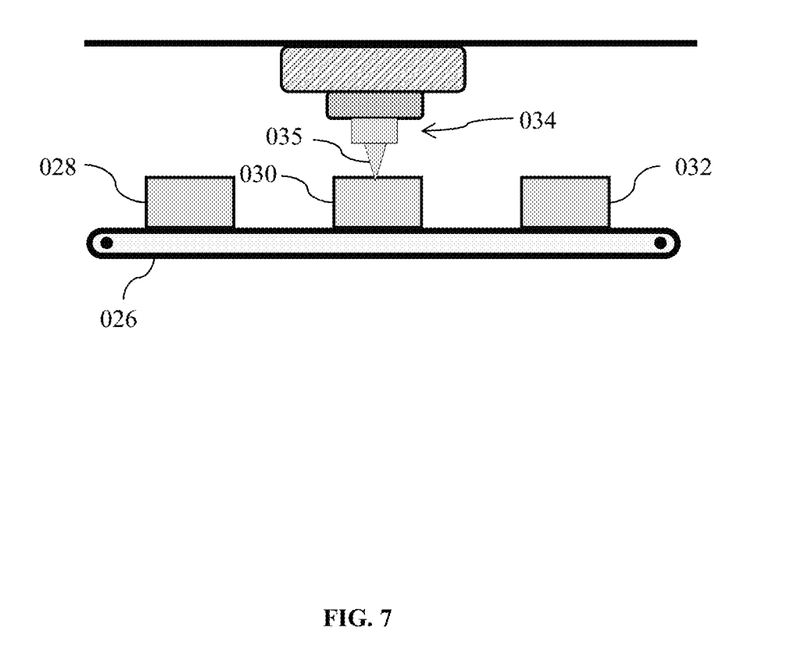
FIG. 7 illustrates a schematic view showing the step of creating and transmitting of the homogenously charged gas into the containment chamber.

The exhaust process is explained in detail in conjunction with FIG. 7 of the present invention. The exhaust valve 514 closes once the expanded charged gas is fully ejected from the cylinder 510. Now, the cycle explained above is repeated, with the inflow valve 406b opening again and allowing a pre-determined amount of compressed charged gas into the cylinder 510. As used herein, farthest position of the piston implies the position where it is at its maximum distance from the inflow valve 406b. And the peak position is when it is closest to the inflow valve 406b.

Figure 6:
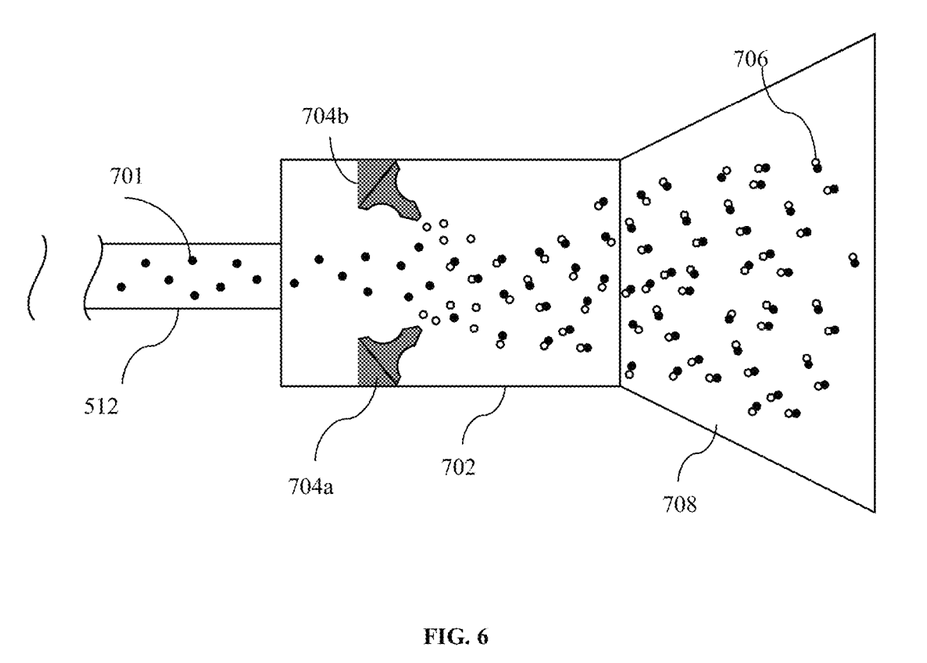
FIG. 6 illustrates a schematic view showing the exhaust process of the charged gas from the energy recovery unit in accordance with a preferred embodiment of the present invention.

FIG. 6 illustrates a schematic view of the exhaust process of the expanded charged gas 701 from the energy recovery unit 402 in accordance with a preferred embodiment of the present invention. The exhaust channel 512 receives the expanded charged gas and transports the charged gas into the deionization chamber 702.

Here a set of deionization injectors such as 704a and 704b, inject particles of the reverse charge polarity into the deionization chamber 702. For instance, if the expanded charged gas 701 is positively ionized, the deionization injectors 704a and 704b inject electrons or other negatively charged particles to create electrically neutral particles 706. The exhaust outlet 708 safely disposes the electrically neutral gas particles 706 into the ambient environment.

FIG. 7 illustrates a schematic view of creating and transmitting of homogenously electrically charged gas into the containment chambers such as 028, 030 and 032 in another preferred embodiment of the present invention. Empty containment chamber 028 moves across on the conveyor belt 026 and is positioned under the charged gas injection system 034.

As shown in FIG. 7, the containment chamber 030, which is already positioned under charged gas injection system 034 receives the electrically charged gas from the charged gas injection nozzle 035. Once a pre-determined amount of charged gas is injected into the containment chamber 030, the containment chamber 030 is sealed to prevent the escape of electrically charged gas. Thus, the containment chamber 030 is then moved for the compression stage.

It would be readily apparent to those skilled in the art that various methods for creating and transmitting the homogenously electrically charged gas into the containment chambers such as 028, 030 and 032 may be envisioned without deviating from the scope of the present invention.

FIG. 8 illustrates another schematic view showing the compressing of homogenously electrically charged gas in the containment chamber 032, which already contains compressed charged gas, using external force in accordance with another preferred embodiment of the present invention. The electrically charged gas in the containment chamber 032 is compressed by using a compression system 802.

The compression system 802 includes a piston compressor 037, the piston head 038, the container holder 042 and the compression heat capture sink 044. The piston head compresses the electrically charged gas stored in the containment chamber 032 on receiving a force from the piston compressor 037. The containment chamber 032 is placed in the container holder 042 to prevent displacement during the compression.

The container holder 042 is made up of a heat conducting material, so any heat dissipated during the compression cycle by the electrically charged gas containment chamber 032 is captured and transmitted by it to the compression heat capture sink 044. The process of compression is explained in detail in conjunction with FIG. 3 of the present invention.

The present invention offers various advantages such as very high energy density, variable power density, rapid recharge, low cost of operation, versatile applications and very high scalability compared to conventional energy storage methods. The invention can be utilized for grid level energy storage, and possibly for transport as well, among other possible applications. The system is safe, environmentally friendly and easy to manufacture as well. But above all, it can carry vastly greater amounts of energy within the same volume and with much less mass than current commercial products such as electric batteries.

There has thus been shown and described a method for storing energy using an electrically charged gas. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for storing energy using an electrically charged gas, the method comprising the steps of:
   compressing the electrically charged gas in a compression chamber using external force to generate compressed charged gas;
   storing the compressed charged gas received from the compression chamber in a containment chamber;

transferring a portion of compressed charged gas into an energy recovery unit at high pressure; and expanding the compressed electrically charged gas to regenerate energy in the energy recovery unit.

2. The method according to claim 1 further comprising the steps of:

creating homogenously electrically charged gas; and transmitting the homogenously electrically charged gas into the compression chamber.

3. The method according to claim 1 further comprising the step of exhausting the expanded charged gas for safe disposal from the energy recovery unit.

4. The method according to claim 1, wherein the gas is Xenon.

5. A method for storing energy using a charged gas, the method comprising the steps of:

creating homogenously electrically charged gas;

transmitting the homogenously electrically charged gas into a containment chamber;

compressing the homogenously electrically charged gas in the containment chamber using external force to generate compressed charged gas;

transferring a portion of compressed charged gas into the energy recovery unit at high pressure; and expanding the compressed electrically charged gas to regenerate energy in the energy recovery unit.

6. The method according to claim 5, wherein the gas is Xenon.

7. The method according to claim 5 further comprising the step of exhausting the expanded charged gas for safe disposal from the energy recovery unit.

* * * * *